United States Patent
Wolfe et al.

(10) Patent No.: US 7,864,747 B2
(45) Date of Patent: Jan. 4, 2011

(54) SYSTEM AND METHOD FOR COMMUNICATING TIMING TO A REMOTE NODE

(75) Inventors: Gregory A. Wolfe, Springhill, KS (US); Michael Bugenhagen, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 120 days.

(21) Appl. No.: 12/250,326

(22) Filed: Oct. 13, 2008

(65) Prior Publication Data

US 2009/0245291 A1   Oct. 1, 2009

Related U.S. Application Data

(60) Provisional application No. 61/040,474, filed on Mar. 28, 2008.

(51) Int. Cl.
*H04J 3/06* (2006.01)
(52) U.S. Cl. ......................... 370/350; 370/324
(58) Field of Classification Search ................ 370/241, 370/252, 503, 507, 350, 324
See application file for complete search history.

(56) References Cited

U.S. PATENT DOCUMENTS

| | | | |
|---|---|---|---|
| 6,631,483 B1 * | 10/2003 | Parrish | |
| 6,661,810 B1 * | 12/2003 | Skelly et al. | |
| 6,775,300 B2 * | 8/2004 | Kuo | |
| 6,975,652 B1 * | 12/2005 | Mannette et al. | |
| 6,980,568 B1 * | 12/2005 | Reynov et al. | |
| 7,079,554 B2 * | 7/2006 | Peled | 370/514 |
| 7,251,256 B1 * | 7/2007 | Barry et al. | 370/503 |
| 7,483,450 B1 * | 1/2009 | Giese et al. | |
| 7,539,200 B2 * | 5/2009 | Bedrosian | 370/395.62 |
| 7,620,836 B1 * | 11/2009 | Chapman et al. | |
| 7,649,910 B1 * | 1/2010 | Wechsler et al. | |
| 7,675,945 B2 * | 3/2010 | Founcand | |
| 7,684,413 B2 * | 3/2010 | Skerritt | 370/395.62 |
| 2002/0178292 A1 * | 11/2002 | Mushkin et al. | |
| 2003/0039272 A1 * | 2/2003 | Dudziak et al. | |
| 2004/0120351 A1 * | 6/2004 | Li et al. | 370/498 |
| 2007/0291777 A1 * | 12/2007 | Jamieson et al. | |
| 2008/0117938 A1 * | 5/2008 | Erich et al. | 370/503 |
| 2008/0151941 A1 * | 6/2008 | Ghodrat et al. | |
| 2008/0225897 A1 * | 9/2008 | Bryant et al. | 370/503 |

* cited by examiner

*Primary Examiner*—Ricky Ngo
*Assistant Examiner*—Dewanda Samuel
(74) *Attorney, Agent, or Firm*—SNR Denton US LLP

(57) ABSTRACT

A system and method for synchronizing a clock for data transmissions. A data packet is received at a remote node. A timing characteristic of the data packet corresponds to a tick of a clock form a reference clock. A tick of the clock is determined based on the timing characteristic of the data packet. A secondary clock is disciplined with the reference clock by adjusting the secondary clock based on a difference between times measured by the reference clock and the secondary clock to generate a clock signal. The clock signal is communicated to one or more interfaces.

17 Claims, 6 Drawing Sheets

SYSTEM AND METHOD FOR COMMUNICATING TIMING TO A REMOTE NODE

PRIORITY

This application claims priority to provisional application Ser. No. 61/040,474, filed on Mar. 28, 2008, which is incorporated herein by reference.

BACKGROUND

The Internet Protocol (IP) includes the rules and encoding specifications for sending data. Layer 3 of the open systems interconnect (OSI) model is the network layer in which protocols such as IP operate. Layer 3 and above services are generally deliverable via Ethernet physical connections. To meet user expectations for high quality Ethernet services, such as differential mode pseudo-wire, a method of monitoring packet performance, such as one-way latency, is required. One-way latency and other performance measurements require a clock reference with a high degree of accuracy.

Communications between packet networks and time domain multiplexing (TDM) or synchronous systems may further complicate performance tracking. Many existing systems and interfaces, such as Ethernet switches, do not provide a cost efficient, robust, and reliable system for maintaining a clock or timing signal.

SUMMARY

A system and method for synchronizing a clock for data transmissions. A data packet may be received at a remote node. A timing characteristic of the data packet may correspond to a tick of a clock from a reference clock. A tick of the clock may be determined based on the timing characteristic of the data packet. A secondary clock may be disciplined with the reference clock by adjusting the secondary clock based on a difference between times measured by the reference clock and the secondary clock to generate a clock signal. The clock signal may be communicated to one or more interfaces.

Another embodiment provides a remote node for communication with a synchronous network. The remote node may include an optical interface for receiving a data signal through a fiber optic. The interface may be operable to extract a tick of a reference clock associated with a timing characteristic of a data packet communicated through the fiber optic. The remote node may also include a clock in communication with the optical interface. The interface may discipline the clock utilizing the tick of the reference clock extracted from the timing characteristic of the data packet to maintain a clock signal. The remote node may also include a timing bus in communication with the clock. The timing bus may be operable to transmit the clock signal to one or more cards. The remote node may also include one or more interfaces in communication with the timing bus. The one or more interfaces may be operable to utilize the clock signal for synchronous communications.

Yet another embodiment provides a system and method for synchronizing a clock for data transmissions. A propagation delay between a sending node and a remote node may be determined. A data packet may be received at the remote node. A leading edge of the packet may correspond to a tick of a clock from a reference clock. The tick of the clock may be determined from the leading edge of the data packet. A secondary clock may be disciplined with the reference clock by adjusting the secondary clock based on a difference between times measured by the reference clock and the secondary clock from the tick of the clock and the propagation delay to generate a clock signal. The clock signal may be communicated to one or more interfaces.

A system and method for synchronizing a clock signal. Data traffic may be received through a first channel of a fiber optic. A clock signal may be received through a second channel of the fiber optic. A clock at a node may be disciplined with the clock signal. The clock signal may be sent from the clock to one or more interfaces within a node.

Another embodiment includes a remote node for communicating a clock signal. The remote node may include an optical interface for receiving data traffic through a first wavelength of a fiber optic and a clock signal through a second wavelength of the fiber optic. The remote node may also include a clock in communication with the optical interface. The clock may be operable to receive the clock signal. The clock may be disciplined with the clock signal to maintain the clock signal. The remote node may include a timing bus in communication with the clock. The timing bus may be operable to transmit the clock signal to one or more cards. The remote node may also include one or more cards in communication with the timing bus. The one or more cards may be operable to utilize the clock signal for synchronous communications.

Yet another embodiment includes a metro Ethernet switch. The switch may include an optical interface for receiving communications through a plurality of fiber optics. A first port of the optical interface may receive data traffic through a first wavelength of a fiber optic and a clock signal through a second wavelength of the fiber optic. The optical interface may include a second port operable to receive the clock signal through another fiber optic in response to determining the clock signal is not received through the second wavelength. The switch may also include a clock in communication with the optical interface. The clock may be operable to receive the clock signal. The clock may be disciplined with the clock signal to maintain the clock signal. The switch may also include a timing bus in communication with the clock. The timing bus may be operable to transmit the clock signal to one or more clocks. The switch may also include one or more clocks in communication with the timing bus. The one or more clocks may be operable to utilize the clock signal for synchronous communications through one or more cards.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

An illustrative embodiment provides a system, method, and remote node for synchronizing a clock of a remote node with a universal time coordinated (UTC) clock for communications signals. The frequency or tick of a clock may be extracted from a timing characteristic of a data packet received at a remote node. The timing characteristic is a parameter, indicator, or characteristic of an arriving packet. In one embodiment, the timing characteristic is a leading or trailing edge of a data packet. Other timing characteristics may also be utilized that may utilize other information, such as average data packet arrival time or the center points of data packets.

The clock tick is a designated time unit. The clock tick may represent seconds, deciseconds, centiseconds, milliseconds, microseconds, nanoseconds, picoseconds, femtoseconds, or another designated subdivision, time, frequency, or multiple of any of the foregoing. For example, one hundred or one thousand clock ticks may occur each second. The tick or frequency of the clock may be utilized to discipline or synchronize the clock output signal of a clock integrated within the remote node. The synchronized clock signal may be communicated to a multiple interfaces which may include cards, ports, subservient clocks and downstream devices, components, and elements for utilization in multiple communications signals.

Another embodiment provides a system and method for communicating a clock signal from a first location to a second location. In one embodiment, data traffic is communicated from a central office to a remote node utilizing a first wavelength. A second wavelength may be utilized to propagate a clock signal from a UTC clock or other highly accurate clock at the central office to one or more remote nodes. The data traffic and clock signal may be propagated through a single port of an optical Ethernet interface.

Figure 1:
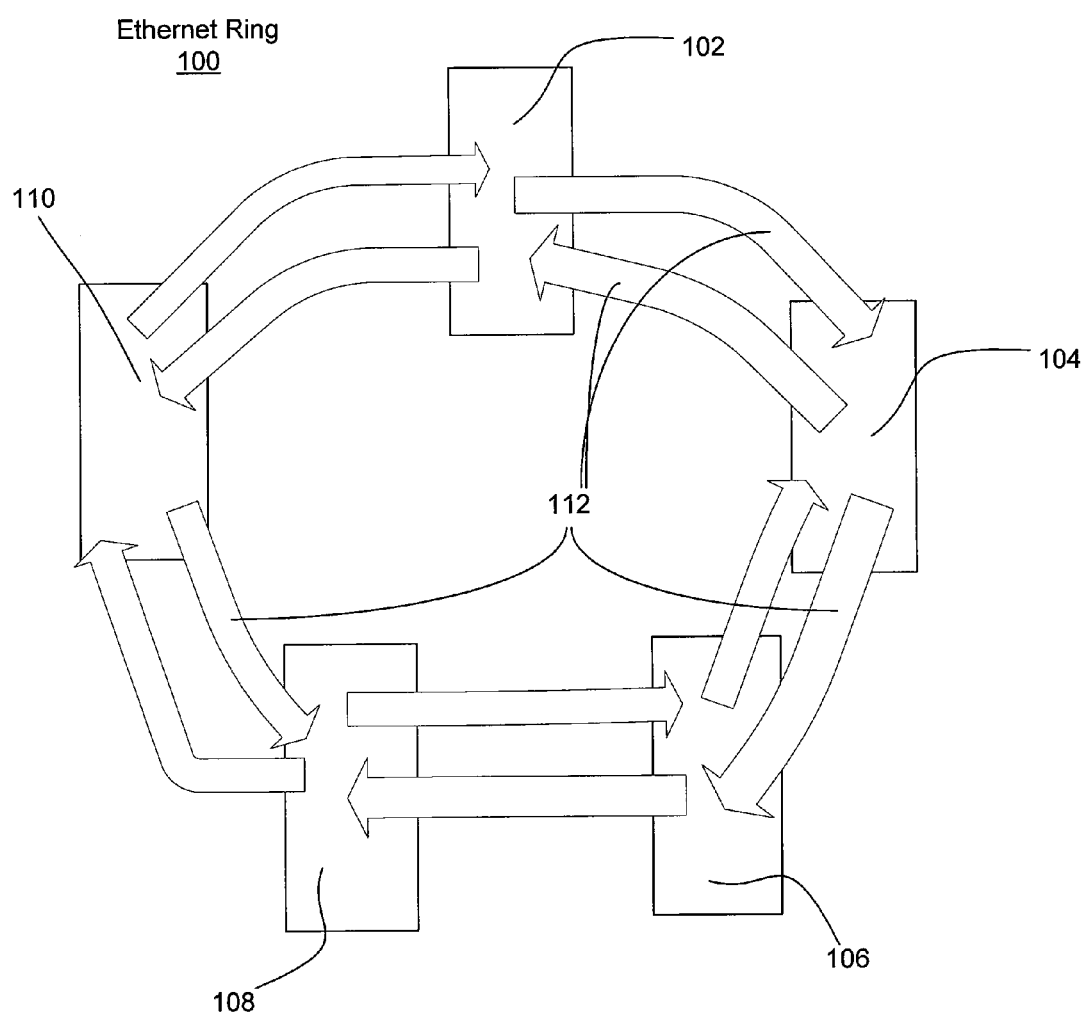
FIG. 1 is a pictorial representation of an Ethernet ring in accordance with an illustrative embodiment.

FIG. 1 is a pictorial representation of an Ethernet ring 100 in accordance with an illustrative embodiment. The Ethernet ring 100 is an Ethernet topology. In one embodiment, the Ethernet ring may a Metro Ethernet network. A metro Ethernet is a layer 2 network that is based on the Ethernet standard and that covers a metropolitan area. Metro Ethernet may be utilized as a metropolitan access network to connect subscribers and businesses to a Wide Area Network (WAN), such as the Internet.

One or more large businesses, organizations, or other groups may also use Metro Ethernet to connect branch offices to an Intranet. The Ethernet ring 100 may be used because Ethernet supports high bandwidth connections and may be easily integrated with and connect to corporate and residential customer devices, networks, or other resources. In one embodiment, the Ethernet ring 100 may provide a next generation replacement of synchronous optical network (SONET) rings.

In one embodiment, the Ethernet ring 100 includes switches 102, 104, 106, 108, and 110, and fiber optics 112. The Ethernet ring 100 may also be any topology, structure, or design suitable for communication, such as hub-and-spoke, star, point-to-point, full mesh, partial mesh, or other Ethernet architectures. The Ethernet ring 100 may include any number of devices, elements, and connections. For example, in order to communicate data through the fiber optics 112, any number of routers, splices, amplifiers, media converters, modulators, multiplexers, light generators, and other elements may be used.

The Ethernet ring 100 is part of a communications network that may utilize a hierarchy, including a core, distribution, and access. The core may be the backbone of the communications network for communicating signals, data, and information from one point to another. The switches 102, 104, 106, 108, and 110 or other data elements are central points of connections for computers and other communications equipment in a communications network. The switches 102, 104, 106, 108, and 110 may be located at one or more central offices, nodes, multi-tenant buildings, hardened cabinets, or other service provider or customer facilities.

The fiber optics 112 are thin strands of specially manufactured plastic or glass used to transport and direct light communications from a source to a given destination. The communications signals may be generated by a laser, light emitting diode (LED), or other optoelectronic device. One or more strands of the fiber optics may transmit and receive communications signals between the switches 102, 104, 106, 108, and 110.

The switches 102, 104, 106, 108, and 110 may need to communicate a clock signal around the Ethernet ring 100 or to an edge aggregator. The edge aggregator is the point, connection, or device at which access legs in communication with customer or user equipment interconnect with the Ethernet ring 100. Clock timing may be particularly important for TDM emulation over packet communications, or other circuit based or time slot based communications protocols and standards over packet communications. Synchronous TDM includes T1, SONET/SDH, and ISDN. Additionally, a clock signal may be required to perform TDM over a non-synchronous packet network with such emulation modes as differential mode pseudo wire. In computer networking and telecommunications, a pseudo wire is an emulation of a native service over a packet switched network. The native service may be ATM, frame relay, Ethernet, low-rate or high-rate TDM, or SONET/SDH.

Figure 2:
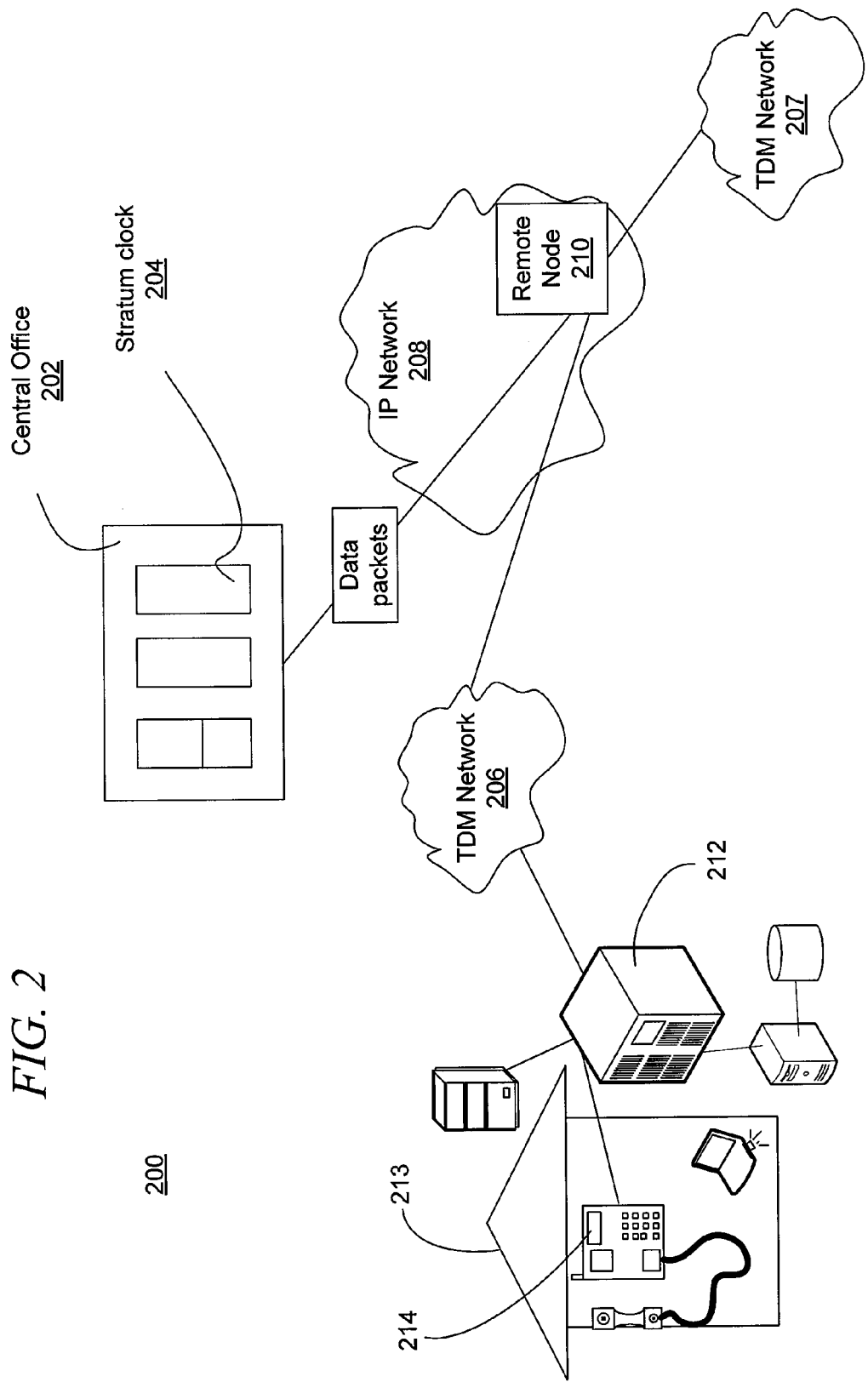
FIG. 2 is a pictorial representation of a communications environment in accordance with an illustrative embodiment.

FIG. 2 is a pictorial representation of a communications environment 200 in accordance with an illustrative embodiment. The communications environment 200 may include any number of networks, systems, devices, and connections. The communications environment 200 is shown for illustration purposes. In one embodiment, the communications environment 200 may include a central office 202, a Stratum clock 204, TDM networks 206 and 207, an IP network 208, a remote node 210, a switch 212, customer 213, and a telephone 214. The communications environment 100 may include various components, nodes, connections, and devices of the Ethernet ring 100 of FIG. 1.

The different elements and components of the communications environment 200 may communicate using hardwired connections, such as fiber optics, T1, cable, DSL, high speed trunks, and telephone lines. Alternatively, portions of the communications environment 200 may include wireless communications, including satellite connections, time division multiple access (TDMA), code division multiple access (CDMA), global systems for mobile (GSM) communications, personal communications systems (PCS), WLAN, WiMAX, or other frequently used cellular and data communications protocols and standards.

The TDM network 206 and 207, and IP network 208 may communicate with any number of networks which may include wireless networks, data, or packet networks, cable networks, satellite networks, private networks, publicly switched telephone networks (PSTN), or other types of communication networks. The networks of the communications environment 200 may represent a single communication service provider or multiple communications services providers. The features, services, and processes of the illustrative embodiments may be implemented by one or more devices of the communications environment 200 independently, or as a networked implementation.

The IP network 208 is a pack-switched internetwork that allows endpoints to communicate. A packet is a formatted unit of data carried by a packet mode or data network. As shown, the remote node 210 may receive a clock signal from the Stratum clock 204 through network 208. The Stratum clock 204 is one embodiment of a highly accurate reference clock that may be utilized to maintain UTC. The Stratum clock 204 may also be an atomic, GPS, or radio clock or other time keeping device suitable for maintaining highly accurate time information.

The switch 212 may be a local exchange, a wire-line switch, or public exchange using time domain multiplexing to provide telecommunications services to a particular subscriber, or groups of subscribers. The switch 212 may be located at a local telephone company's central office, or at a business location serving as a private branch exchange. The switch 212 may provide dial-tone, calling features, and additional digital and data services to subscribers, such as the telephone 214 utilized by the customer 213.

The customer 213 is an example of a user, residence, building, or location of a person or group that may utilize any number of communications services. The customer 213 is shown as a residence in the illustrated example, however, the customer 213 may also be an office, business, individual, group of users, or other entity suitably equipped to receive telephone, data, and other communication services. The customer 113 may utilize multiple communications devices and services which may include the telephone 214. The telephone 214 may be a standard device that provides dialing and voice conversation capabilities. The customer 213 may also utilize a client, such as a personal computer, laptop, or PDA. The client may be a personal computer for performing and executing programs and instructions, and accessing and communicating through one or more communications networks.

The remote node 210 may utilize the clock signal from the Stratum clock 204 to perform synchronous communications with the TDM networks 206 and 208. As further described herein, the clock signal may be determined from a packet arrival time of data traffic or through a secondary wavelength communicated to the remote node from the central office 202.

Figure 3:
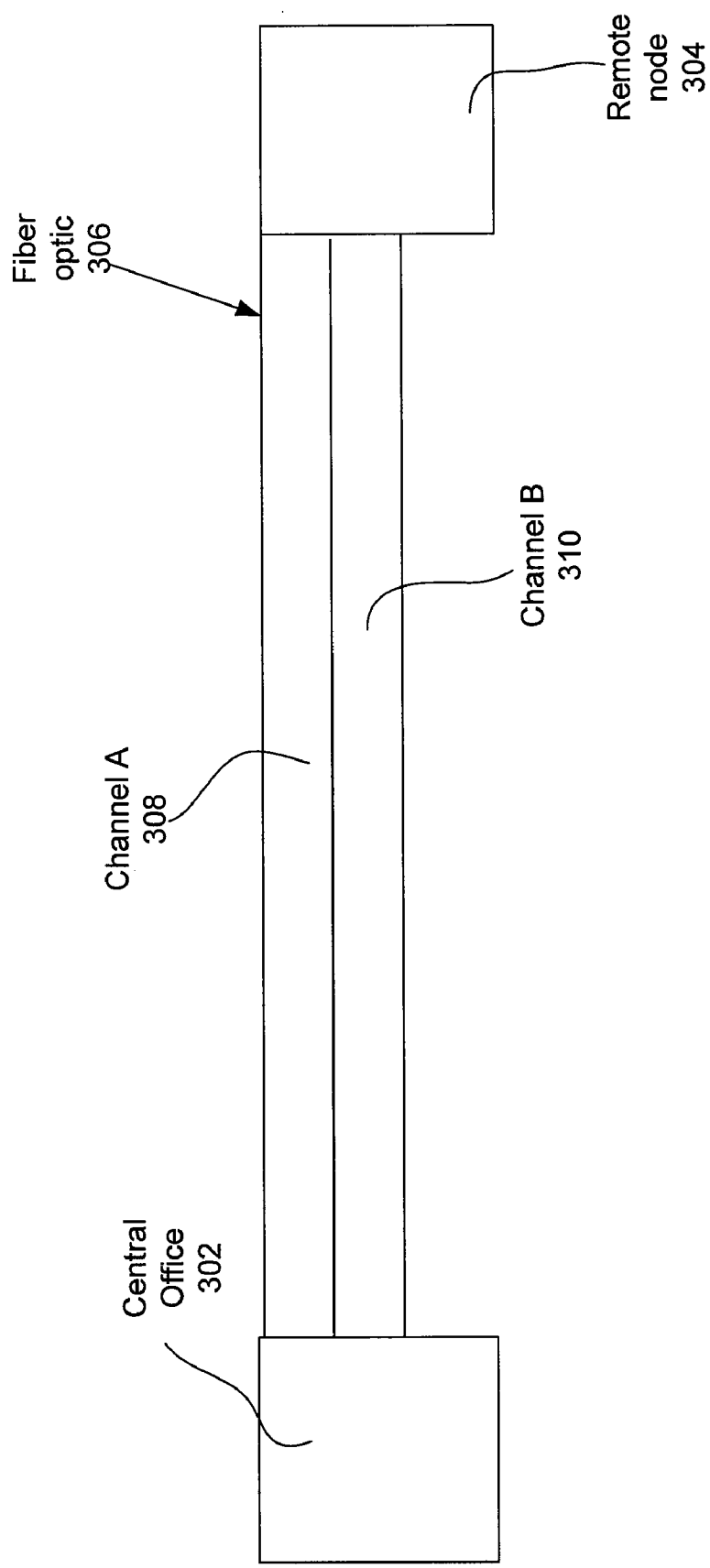
FIG. 3 is a pictorial representation of communications between a central office and a remote node in accordance with an illustrative embodiment.

FIG. 3 is a pictorial representation of communications between a central office 302 and a remote node 304 in accordance with an illustrative embodiment. The central office 302 and the remote node 304 may be particular implementations of the switches 102, 104, 106, 108, and 110 of FIG. 1. FIG. 3 may illustrate an optical layer permitting communication between the central office 302 and the remote node 304.

The central office 302 and the remote node 304 may communicate through the fiber optic 306. The fiber optic 306 may include one or more strands. The example of FIG. 3 illustrates a single strand of fiber optic with channels A 308 and channel B 310. The strands within the fiber optic 306 may utilize one or more wavelengths, lambdas, or frequencies. The fibers or strands in the fiber optic 306 may be multimode fibers or single mode fibers.

The central office 302 includes a UTS. The clock signal may be propagated to the remote node 304 packet to TDM conversion. In one embodiment, the UTS may be a bits clock linked to a global positioning system (GPS) reference source or an atomic clock.

In a first embodiment, the data traffic may be communicated through channel A 308. The channel is a fiber or a wavelength utilized to communicate signals, data, or other information. In order to recover a clock signal or frequency from a high accuracy clock at the central office 302, the data packets may be sent only on clock ticks. In one embodiment, the leading edge of a packet or data signal may represent a clock tick. In another embodiment, the end of a packet, middle or other information linked with the arriving packet may indicate the clock tick.

Data packets are not required to be sent on every tick of the clock, but rather only when data packets are available. In one embodiment, a status, link, clock, update, or synchronization packet may be sent if a data packet has not been transmitted from the central office 302 to the remote node 304 within a time period. For example, if a data packet has not been sent for five milliseconds, a data packet may be sent to the remote node 304 to ensure that the clock signal may be recovered and utilized to update or synchronize one or more clocks of the remote node 304.

To maintain an accurate time reference, a clock at the remote node 304 may be corrected to correspond with the UTS at regular intervals. The clock may be extracted by one or more Ethernet switches, routers, or similar devices utilizing a standard, such as Institute of Electrical and Electronics Engineers (IEEE) 1588 entitled a "Standard for a Precision Clock Synchronization Protocol for Networked Measurement and Control Systems".

In a second embodiment, the data traffic sends and receives between the central office 302 and the remote node 304 may be transmitted through channel A 308. The clock signal may be communicated from the central office 302 to the remote node 304 through channel B 310. As a result, the clock signal or timing is sent out-of-band for receipt by the remote node 304. The data traffic through channel A 308 may occur non-synchronously with less processing and manipulations reducing the expenses and equipment at both the central office 302 and the remote node 304. As a result, the clock signal may be more easily recovered at the remote node 304 for use with synchronous Ethernet, pseudo wire, error checking, or disciplining a local clock signal. For example, TDM and synchronous communications, such as synchronous Ethernet, may require a clock signal that is highly accurate or synchronized with one or more systems, offices, nodes, devices or connections in order to perform communications.

The illustrative embodiments may track the path delay between one or more elements, such as the central office 302 and the remote node 304. In one example, the path delay may be calculated by measuring the round trip delay of a packet between central office 302 and the remote node 304. For example, the delay may be 7 milliseconds and as a result, the central office 302 and the remote node 304 may determine that there is a transmission delay of 3.5 milliseconds between the devices or points. Processing or time for analysis may also be included in the transmission delay. The clocks may be synchronized based on a single delay test, periodically, or frequently based on existing needs. A single port or interface may communicate the retrieved clock signal to discipline a clock at the remote node 304. The clock may be a central device that further distributes the clock signal to one or more cards, ports, or internal or external devices. As a result, timing may be more efficiently communicated between devices utilizing fiber optic connections.

In one embodiment, the time or tick difference between a reference clock at the central office 302 or other node and the remote node 304 may be utilized to discipline the clock at the remote node 304. For example, the clock signal may be retrieved by analyzing the signal to determine the signal or packet characteristics, such as a leading edge as measured based on one or more thresholds, corresponding to the clock signal. The clock signal may also be retrieved utilizing standard clocking processes and standards.

Figure 4:
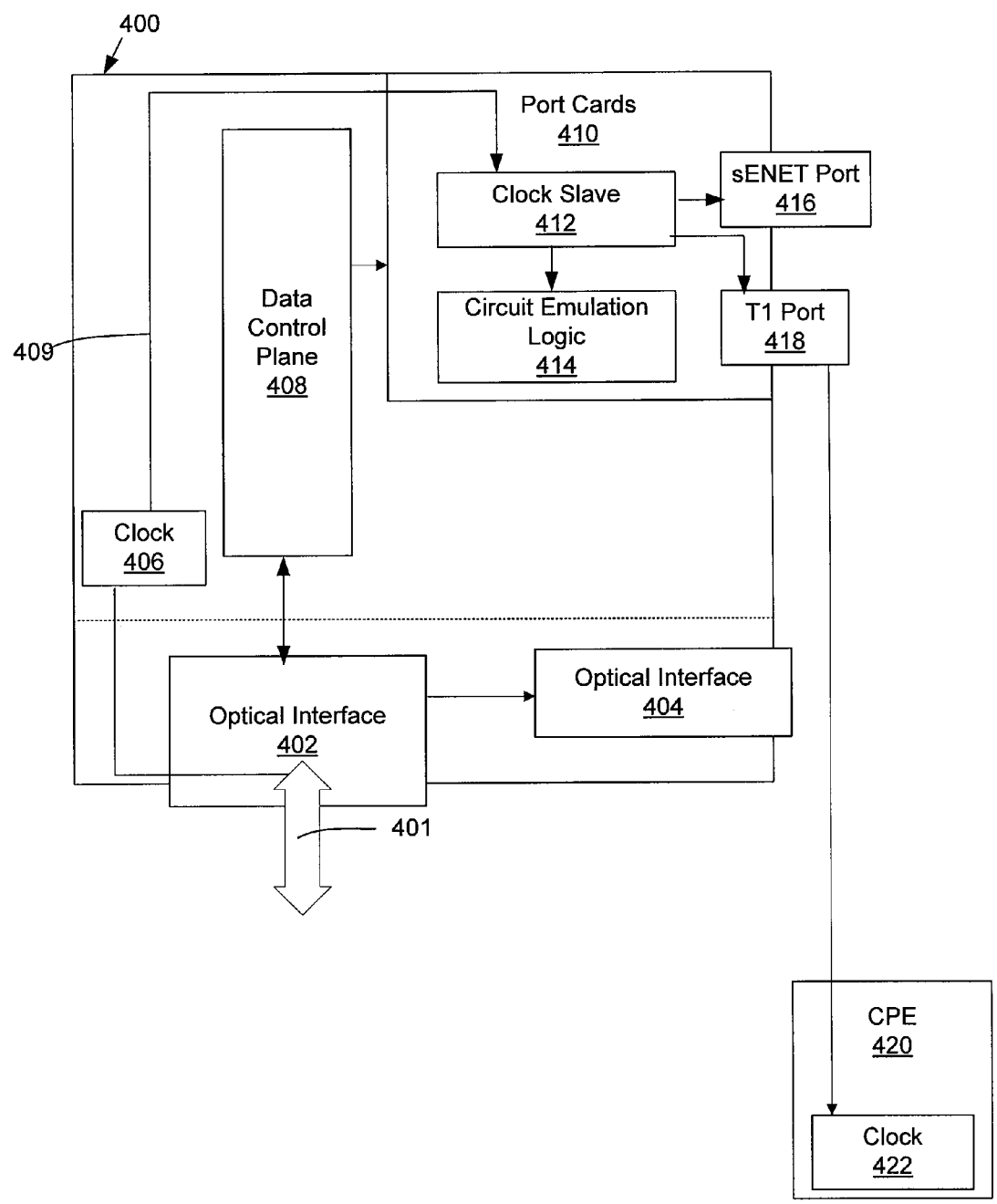
FIG. 4 is a block diagram of a remote node in accordance with an illustrative embodiment.

FIG. 4 is a block diagram of a remote node in accordance with an illustrative embodiment. The remote node 400 is one embodiment of a Ethernet aggregation switch, router, or other intelligent communications device. The remote node 400 may include fiber optics 401, optical interfaces 402 and 404, a clock 406, a data control plane 408, a timing bus 409, port cards 410, a clock slave 412, circuit emulation logic 414, synchronous Ethernet port 416 (sENET), and T1 port 418. The remote node 400 may further communicate with customer premise equipment (CPE) 420 that may include a clock 422. The remote node 400 is a particular implementation of the remote node 304 of FIG. 3. In one embodiment, the remote node 400 includes a chassis for receiving a plurality of externally connectable elements. The remote node 400 may utilize various planes to route data, information, and signals which may include a forwarding plane for communications between ports, the data control plane 408 that acts as a switching or routing plane for moving data packages from one location to another, and a timing plane for moving a clock signal.

The remote node 400 may maintain a clock signal disciplined through signals communicated by the fiber optics 401 for multiple interfaces, systems, clocks, cards, ports, and downstream devices and elements. The remote node 400 may further include any number of processors, memories, busses, circuits, sockets, ports, and other elements.

The optical interfaces 402 and 404 are optical transceivers for both telecommunication and data communications applications. In one embodiment, the optical interfaces 402 and 404 are optical Ethernet interfaces, such as a small formfactor pluggable (SFP). The optical interface 402 is a receptacle for interfacing the fiber optics 401 with the data control plane 408. The optical interfaces 402 and 404 may communicate or be connected through a mother board, bus, or other device. The optical interface 404 may interconnect a mother board of the remote node 400 to an network cable including an unshielded twisted pair of a network cable.

In one embodiment, the optical interfaces 402 and 404 may extract the clock signal for communication to the clock in any number of formats. For example, the optical interfaces 402 and 404 may determine the clock signal utilizing a timing characteristic of a packet, the clock signal may be transmitted to the clock 406 as digital or analog values, signals, or information. In another example, the optical interfaces 402 and 404 may retrieve the clock signal through a wavelength out-of-band with data traffic through a modulated signal or data packets including the clock signal.

In another embodiment, the optical interface 402 and 404 may communicate the clock signal to the clock 406 for retrieval or extraction. The clock 406 may be disciplined based on arrival timing of an incoming data packet. In one embodiment, the arrival timing may be a leading edge of an Ethernet or data packet. The clock 406 may adjust itself up or down as needed. If the clock 406 is correct, no disciplining or adjustments are required. The clock 406 may similarly discipline, synchronize, or update one or more other clocks, such as the clock slave 412 and the clock 422. The clock signal is also passed to the line, circuit emulation, or port cards 410 of the remote node 400. The port cards 410 are a particular representation of an interface to other devices, nodes, connections, or customer equipment.

In one embodiment, the remote node 400 may be equipped with a separate timing bus 409 from the packet side of the remote node 400 to the tributary or line side of the remote node 400. The timing bus 409 is a transmission path that distributes or transfers the clock signal outside of the data path bus. The timing bus 409 may be wires, leads, electrical connections, or other conducting mediums. In one embodiment, the clock 406 is an IEEE 1588 clock that communicates a clock signal to the port cards 410 through the timing bus 409. The circuit emulation logic 414, cards utilizing pseudo wire and T1 port 418, and Ethernet port 416 may utilize the clock signal for TDM, synchronous Ethernet, or other similar services. The different cards and ports of the remote node 400 may rely on the clock 406 instead of free running or utilizing more expensive alternatives. The port cards 410, circuit emulation logic 414, T1 port 418, and the Ethernet port 416 may send synchronous communications electrically or optically to any number of other devices. The CPE 420 is terminating equipment at a subscriber's premises that communicates directly or indirectly through a network with the remote node 400. The CPE 420 may include telephones, modems, terminals, exchanges, switches, routers, set-top boxes, and other similar network equipment. The CPE 420 may include the clock 422 that may be further updated or disciplined based on communications from the remote node 400.

In one embodiment, the front edge of a data packet may be utilized to indicate a tick of the UTC clock for disciplining in the clock 406. The size of data packets may vary and as a result, the leading edge of a data packet may be sent from the central office or another node only on a corresponding clock tick. The central office may send a data packet within a specified time period, range, or interval to ensure the clock 406 is properly disciplined. The clock 406 may distribute timing to the port cards 410 for replication of TDM and synchronous Ethernet services. In one embodiment, the clock 406 may determine or extract the clock signal received from the fiber optics 401 before the data in the data packet is extracted or further communicated. The disciplined clock 406 may better allow for error checking and avoiding clock skew.

In another embodiment, the optical interface 402 may extract the clock signal, timing, or frequency of a UTC clock from a secondary channel. The UTC clock may utilize any number of international or domestic standards and protocols for maintaining correcting timing. For example, the UTC clock may be a Stratum 3 clock. The optical interface 402 may include a port for connecting to the fiber optics 401. A strand of the fiber optics 401 may communicate utilizing any number of wavelengths. In one embodiment, a dedicated wavelength is utilized to communicate timing to the remote node 400. As a result, the incoming data packets may be sent asynchronously reducing the processing power and analysis required at the sending side for communications.

In one embodiment, the incoming clock signal may be modulated utilizing the second wavelength to indicate clock ticks. In another embodiment, data within data packets sent utilizing the second wavelength may indicate the time of day, clock tick, or other timing information or data. The clocking signal is similarly utilized to discipline the clock 406. The optical interface may split, filter, or separate the wavelengths. The data packets are sent to the data control plane 408 for routing and the clock signal is communicated to the clock 406.

Figure 5:
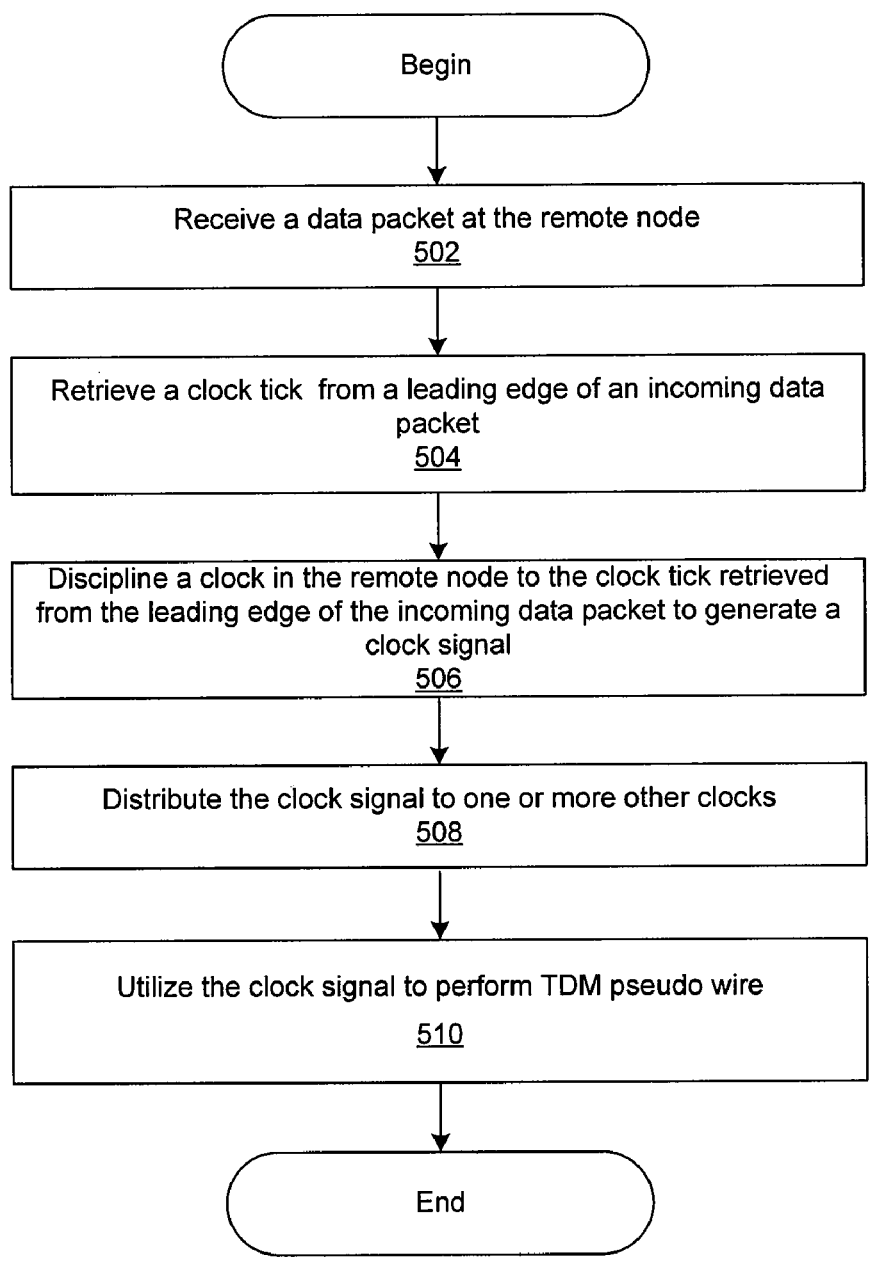
FIG. 5 is a flowchart of a process for disciplining a clock of a remote node in accordance with an illustrative embodiment.

FIG. 5 is a flowchart of a process for disciplining a clock of a remote node in accordance with an illustrative embodiment. The processes of FIGS. 5 and 6 may be implemented by a remote node. The remote node may receive communications through one or more strands of fiber optics. For example, the remote node may communicate with a central office utilizing a separate strand for data and telecommunication signals transmitted and received. The remote node may include an optical interface for communicating through the fiber optics, a clock that may be disciplined based on signals received through the fiber optics, port cards, and any number of other downstream devices that may be integrated with the remote node or communicate with the remote node.

The process of FIG. 5 may begin by receiving a data packet at the remote node (step 502). The data packet may include or encapsulate data or other information that is frequently exchanged between nodes in an optical network. The data packet may be received from a central office, another node, or any number of other devices, systems, networks, or connections.

Next, the remote node retrieves a clock tick from a leading edge of an incoming data packet (step 504). The data packet sent in step 502 may be sent to coordinate with a tick, clock signal, or reading of a UTC, stratum, or reference clock available at another node or at the central office. The sending device may coordinate one or more data packets so that the leading edge of the data packet always corresponds with a clock tick. The leading edge may correspond or represent the clock tick regardless of whether one or more clock ticks are skipped between transmission of data packets. In one embodiment, only the leading edge of every other data packet or some other multiple may correspond with a clock tick. Utilizing the leading edge of the incoming data packet is a particular embodiment. Another embodiment may associate a trailing edge of the data packet with the clock tick. Similarly, any timing characteristic of the arrival of the data packet or packet characteristic may correspond or be associated with the clock tick. Depending on the type of communication, the clock tick may correspond to a millisecond, microsecond, nanosecond or other portion, multiple, or factor of a second. During step 504, any number of standards may be utilized by the interface to retrieve the clock signal and then subsequently for the clock to communicate the clock signal through a timing bus or plane separate from a data bus or plane.

Next, the remote node disciplines a clock in the remote node to the clock tick retrieved from the leading edge of the incoming data packet to generate a clock signal (step 506). The clock in the remote node may be adjusted by varying the voltage or oscillations of the clock to discipline and update the clock based on the clock tick.

In one embodiment, synchronous Ethernet standards, such as the International Telecommunication Union (ITU) Telecommunication Standardization Sector (ITU-T) Recommendation G.8261/Y.1361 may be utilized to retrieve and discipline the clock. ITU-T Recommendation G.8261/Y.1361 entitled "Timing and Synchronization Aspects in Packet Networks" specifies the upper limits of allowable network jitter and wander, the minimum requirements that network equipment at the TDM interfaces at the boundary of these packet networks may tolerate, and the minimum requirements for the synchronization function of network equipment. Other similar standards may be similarly utilized. During step 506, the remote node may also set the intermittent time of day or time of day setting to coordinate with the clock tick from the UTC clock. In some embodiments, the clock within the remote node may be required to have a specific degree of accuracy in order to ensure that the timing and clock signal tracked or generated by the clock is sufficiently accurate to discipline the clock based on incoming data packets.

Next, the remote node distributes a clock signal to one or more other clocks (step 508). The other clocks may include subservient or slave clocks that communicate with the clock of the remote node. For example, a master clock of the remote node may be disciplined based on the incoming data packets. The master clock may then communicate the clock signal or updated clock signal to one or more servant clocks. A timing bus or plane may communicate the clock signal.

Next, the remote nodes utilizes the clock signal to perform TDM pseudo wire (step 510). The other clocks may be integrated or communicate with interfaces, cards, ports, elements, or other devices that utilize the clock signal to perform TDM or synchronous communications. During step 510, the clock signal may be used to emulate a TDM pseudo wire point for efficient and error free communications. The remote node may additionally communicate the clock signal to one or more additional nodes utilizing a timing characteristic or other signaling scheme, standard, or protocol. The process of FIG. 5 may allow the remote node to more accurately discipline the clock and distribute the clock signal timing or frequency to one or more other elements.

Figure 6:
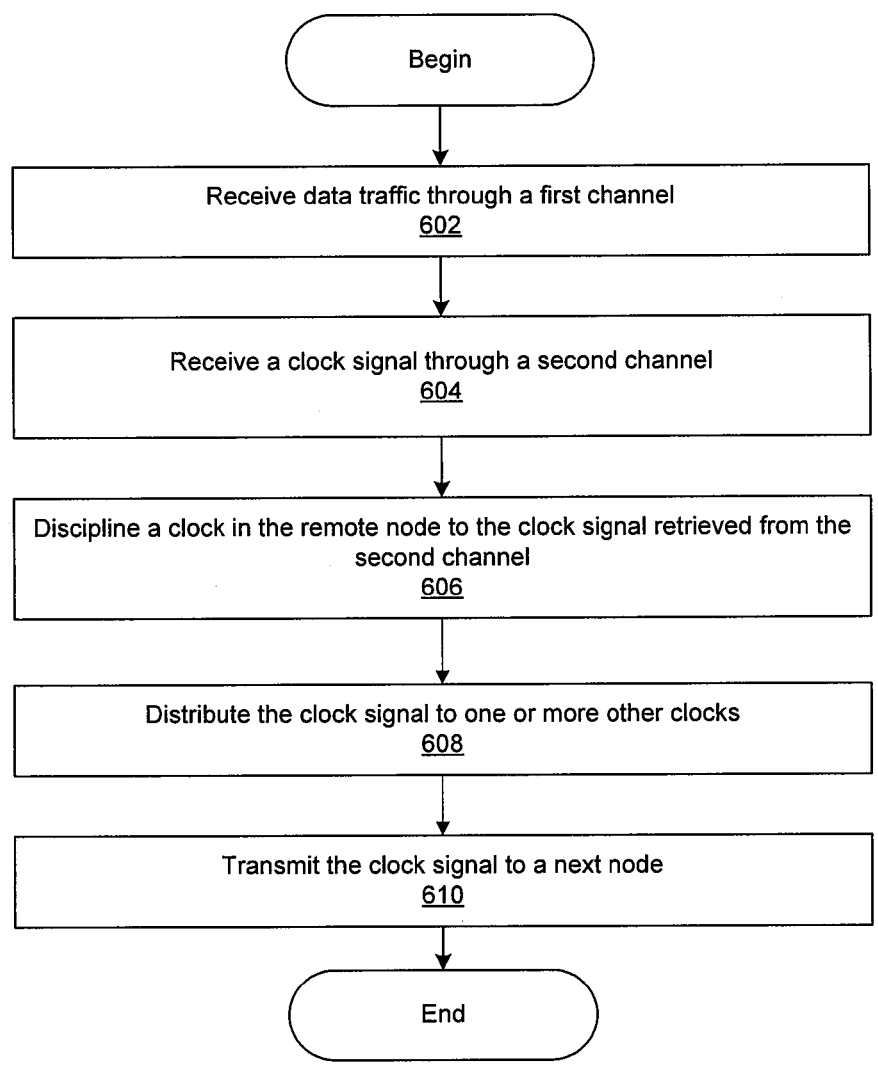
FIG. 6 is a flowchart of a process for communicating a clock signal in accordance with an illustrative embodiment.

FIG. 6 is a flowchart of a process for communicating a clock signal in accordance with an illustrative embodiment. The process of FIG. 6 may begin by receiving data traffic through a first channel (step 602). The first channel may represent a wavelength or lambda of a fiber optic strand. The data traffic may include telecommunications and packet communications communicated within an optical network.

Next, the remote node receives a clock signal through a second channel (step 604). The clock signal may be transmitted to the remote node from a UTC clock. The second channel may be a second wavelength communicated through the fiber optic strand the first channel utilizes. The clock signal may be a wavelength or color designated by the ITU for communicating a clock signal, timing or frequency. In one embodiment, the clock signal may be communicated by modulating the light received by the remote node. For example, the light source may be rapidly turned on and off to represent clock ticks. In another embodiment, the clock signal may include, data packets that contain information regarding the applicable clock tick, intermittent time of day, time of day, or other timing information. The remote node may determine the clock signal by analyzing the signal or data of the second out-of-band channel.

Next, the remote node disciplines a clock in the remote node to the clock signal retrieved from the second channel (step 606). The clock may be disciplined by adjusting the time of day, clock ticks, oscillation, frequency, or other information utilized by the clock to track timing information. The remote node distributes the clock signal to one or more other clocks (step 608). The remote node may include one or more slave clocks that receive the clock signal through a timing bus that operates independent of the data bus. The slave clocks may be in the remote node or one or more other interfaces, cards, or downstream devices. The clock signal may be utilized to perform TDM pseudo wire and any number of synchronous communications.

Next, the remote node transmits the clock signal to a next node (step 610). The clock signal may be communicated utilizing fiber optic or electrical connections to the next node. In one embodiment, the clock signal may be communicated utilizing a second channel similar or identical to the way the clock signal was received in step 604. Any number of other communications standards and methods may also be utilized including the process described in FIG. 5. The next node may be a switch in a ring, CPE, or other device, equipment or system.

In one embodiment, the remote node may be configured to determine whether the clock signal is being received in step 604. If the clock signal, not being received through the second channel, is incorrect, or has faltered, the remote node may utilize logic or an algorithm to perform clock discipline in a secondary clock signal. For example, a secondary clock signal may be incoming from another side of a metro Ethernet ring of which the remote node is part of The previous detailed description is of a small number of embodiments for implementing the invention and is not intended to be limiting in scope. The following claims set forth a number of the embodiments of the invention disclosed with greater particularity.

What is claimed:

1. A method for synchronizing a clock for data transmissions, the method comprising:
   receiving a data packet at a remote node, a timing characteristic of the data packet corresponding to a tick of a clock from a reference clock;
   determining the tick of the clock based on the timing characteristic of the data packet;
   disciplining a secondary clock with the reference clock by adjusting the secondary clock based on a difference between times measured by the reference clock and the secondary clock to generate a clock signal;
   generating the clock signal regardless of whether the data packet is received for disciplining the secondary clock; and
   communicating the clock signal to one or more interfaces.

2. The method according to claim 1, wherein the timing characteristic is a leading edge of the data packet.

3. The method according to claim 1, wherein one or more data packets including the data packet utilized for determining the tick of the clock are not received for each and every tick of the clock generated by the reference clock.

4. The method according to claim 1, wherein the data packet is an Ethernet packet received from a central office through a metro Ethernet network, and wherein the reference clock is a Stratum clock.

5. The method according to claim 1, wherein the secondary clock is adjusted to an accuracy of at least one millisecond.

6. The method according to claim 1, further comprising:
   determining a delay between the reference clock and the remote node, wherein the disciplining is performed utilizing the delay.

7. The method according to claim 1, sending an inactivity packet at an interval in order to synchronize the secondary clock.

8. The method according to claim 1, further comprising:
   determining the tick of the clock before separating data from the data packet.

9. The method according to claim 1, further comprising:
   communicating the clock signal from the secondary clock to one or more slave clocks; and
   performing error checking within the remote node utilizing the clock signal.

10. A remote node for communication with a synchronous network, the remote node comprising:
    an optical interface for receiving a data signal through a fiber optic, the optical interface operable to extract a tick of a reference clock from a data packet included in the data signal, the tick of the reference clock being associated with a leading edge of the data packet, wherein the reference clock is an atomic clock;
    a clock in communication with the optical interface, the optical interface disciplininges the clock utilizing the extracted tick of the reference clock to maintain a clock signal, wherein the clock tracks time using the leading edge and without being updated by the reference clock;
    a timing bus in communication with the clock, the timing bus operable to transmit the clock signal to one or more cards; and
    one or more interfaces in communication with the timing bus, the one or more interfaces operable to utilize the clock signal for synchronous communications.

11. The remote node according to claim 10, wherein the remote node is a switch, wherein the one or more interfaces are one or more cards, and wherein the timing characteristic is a leading edge of the data packet.

12. The remote node according to claim 10, further comprising:
    a slave clock in communication with the timing bus, the slave clock utilizes the clock signal for the synchronous communications through the one or more interfaces.

13. The remote node according to claim 10, wherein the interface disciplines the clock utilizing a propagation delay between sending node and the remote node.

14. A method for synchronizing a clock for data transmissions, the method comprising:
    determining a propagation delay between a sending node and a remote node;
    receiving a data packet at the remote node in response to a first data stream being available, a leading edge of the data packet corresponding to a tick of a clock from a reference clock;
    determining the tick of the clock from the leading edge of the data packet;
    disciplining a secondary clock with the reference clock by adjusting the secondary clock based on a difference between times measured by the reference clock and the secondary clock from the tick of the clock and the propagation delay to generate a clock signal in response to receiving the first data stream, wherein the secondary clock is disciplined based on data packets received through a secondary data stream in response to determining the first data stream including the data packet is unavailable; and
    communicating the clock signal to one or more interfaces.

15. The method according to claim 14, wherein the leading edge of a plurality of data packets received by the remote node corresponds to the tick of the clock, wherein the reference clock is an atomic clock, and wherein the clock tracks time when data packets are not received.

16. The method according to claim 14, further comprising:
    determining the clock signal from another data stream in response to not receiving the data packet;
    disciplining a slave clock in communication with the secondary clock through a timing bus, the slave clock being utilized by the one or more interfaces.

17. The method according to claim 14, wherein the communicating is performed through a timing bus, wherein the remote node is a metro Ethernet switch, wherein at least one of the one or more interfaces perform synchronous communications requiring the clock signal.

* * * * *